United States Patent [19]

Walter

[11] 4,212,010

[45] Jul. 8, 1980

[54] METHOD FOR THE OPERATION OF A DISPLAY DEVICE HAVING A BISTABLE LIQUID CRYSTAL LAYER

[75] Inventor: Karl H. Walter, Grafing, Fed. Rep. of Germany

[73] Assignee: Siemens Aktiengesellschaft, Berlin & Munich, Fed. Rep. of Germany

[21] Appl. No.: 837,199

[22] Filed: Sep. 28, 1977

[30] Foreign Application Priority Data

Oct. 1, 1976 [DE] Fed. Rep. of Germany ....... 2644449

[51] Int. Cl.[2] ............................................. G06F 3/14

[52] U.S. Cl. .................................... 340/784; 340/789; 340/811

[58] Field of Search ....................... 350/330, 331, 333; 340/324 M, 811, 756, 784, 752, 789, 765

[56] References Cited

U.S. PATENT DOCUMENTS

| | | | |
|---|---|---|---|
| 3,922,667 | 11/1975 | Ueda et al. | 350/333 |
| 3,936,815 | 2/1976 | Kogure | 350/333 |
| 3,955,187 | 5/1976 | Bigelow | 350/330 |
| 3,982,239 | 9/1976 | Sherr | 350/331 |
| 3,995,942 | 12/1976 | Kawakami et al. | 350/333 |
| 4,044,346 | 8/1977 | Akahane et al. | 350/333 |
| 4,048,633 | 9/1977 | Sano | 350/333 |

*Primary Examiner*—Marshall M. Curtis
*Attorney, Agent, or Firm*—Hill, Van Santen, Steadman, Chiara & Simpson

[57] ABSTRACT

An improved method of operating a display device having a bistable liquid crystal layer disposed in a conductor matrix consisting of rows and columns characterized by applying the various signals as a sequence of elementary pulses and during the addressing of a row, erasing the plurality of the next following rows. The method utilizes a two-phase write-in technique which produces images having a good optical quality and enables utilizing integrated circuits.

4 Claims, 3 Drawing Figures

METHOD FOR THE OPERATION OF A DISPLAY DEVICE HAVING A BISTABLE LIQUID CRYSTAL LAYER

BACKGROUND OF THE INVENTION

1. Field of the Invention

The present invention is directed to a process for operating a display screen having a liquid crystal layer disposed between rows and columns of a conductor matrix with the liquid crystal layer being switched from a first optical state to a second optical state by applying a voltage higher than an upper threshold voltage $U_{12}$, being switched from the second to the first optical state by applying a voltage lower than a lower threshold voltage $U_{21}$ and being maintained in one of said optical states by applying a holding voltage $U_h$ with $U_{21}<U_h<U_{12}$.

2. Prior Art

A bistable liquid crystal matrix display and the method of addressing the various matrix points of the display is described in an article in *Berichte der Bunsen-Gesellschaft,* Vol. 78, No. 9, 1974, pages 912–914. In this article, the display utilizes a cholesterin liquid crystal layer having a positive, anisotropic dielectric constant with the cell having vertical wall orientations. As pointed out in the article, when a voltage $U_{12}$ is applied, the liquid crystal assumes a homeotropic-nematic texture, and, when the voltage drops below a lower threshold $U_{12}$, the liquid crystal assumes a focal conical orientation which is a light scattering state. Thus, when a cell is disposed between cross polarizers the liquid crystal layer is in a homeotropic state or orientation, the cell will not pass light; however, the focal conical orientation or state, which causes scattering and depolarization of the light in the cell, will enable light to pass through the cross polarizers.

As pointed out in the reference, the procedure or method for using the device was as follows: first all of the matrix points were brought into an "off" or homeotropic state by a high voltage pulse and then a holding voltage $U_h$ is connected or applied to maintain or conserve the "off" state. Thereafter, the rows are consecutively scanned with a voltage pulse of the magnitude $U_h$ and the matrix elements or points of the row, which points are to be switched to a light transmitting or "on" state, are subjected to a voltage at the lower threshold, which voltage is preferably zero, until the focal conical orientation or state is formed. Meanwhile, the voltage $2U_h$ is connected to the remaining matrix elements of the row which are not being switched. Following the write-in step, a return is made to a voltage $U_h$ to maintain the layer between each of the matrix points of the row in the desired optical state or condition.

The process is referred to as a "two-phase write-in" which involves an erasure as the first phase and the write-in as the second phase. The process utilizes a relatively low circuitry outlay; however, since the images are alternately constructed row by row and then totally erased, an attractive representation is not achieved. If the entire matrix were no longer erased at a specific time, but the individual rows are erased directly prior to addressing step, the optical impression could be considerably improved. This type of operation does, in fact, produce virtually steady images which exhibit virtually no optical interference but since a row-wise or row-group-wise supply of the drive circuits with a connected supply voltage leads to an extremely high outlay in the drive component, this type of operation is obviously unsuitable for use with integrated circuits.

Investigations carried out in association with the present invention have indicated that in particular in the case with the liquid crystal displays having a high multiplex ratio and small image points, a periodic erasure is to be maintained. In fact, when the holding voltage is connected, the optical state at each image point becomes increasingly disturbed from the edge-in liquid crystal displays long disinclination lines gradually travel inward and the image point can only be reconverted into a clean "off" texture by a significantly high voltage pulse. In other words, the "off" texture is disturbed and will gradually change into an "on" texture.

SUMMARY OF THE INVENTION

The present invention is directed to a method of operating a display screen utilizing a two-phase write-in technique which leads to images having a good optical quality and can be constructed relatively simply to even use integrated circuits.

To accomplish these aims, the present invention is directed to an improvement in a method for operating a display screen having a liquid crystal layer disposed between rows and columns of a conductor matrix, said liquid crystal being switched from a first optical state to a second optical state by applying an upper threshold voltage $U_{12}$, being switched from the second to the first optical state by applying a lower threshold voltage $U_{21}$, and being maintained in at one of said optical states by applying a holding voltage $U_h$ with $U_{21}<U_h<U_{12}$, said method comprising writing in information into the display by addressing the rows in a serial fashion and operation of the columns with its relevent row data in parallel with respect to each row with the information being subsequently held in the device and being erased prior to the next write-in step with the improvements comprising during the addressing of each row, erasing a predetermined number of the next following rows while maintaining the states in the remaining rows, that all the signals which are fed to the conductor matrix, namely the switching, holding, erasing signals on the row conductors and the "off" and "on" information signals for the column conductors consist of a sequence of pulses or pulse groups with each of the sequences having the same period of duration T, all pulses of the sequences consisting of elementary pulses having a magnitude $U_0$ and a duration T/2m where m is a natural number and the interval of time between consecutive pulses being shorter than the shortest transition time of the layer between the two optical states, the row addressing time t being at least equal to the transition time of the layer from the second to the first optical state so that effective voltages at the matrix point operate on the layer during the addressing time, said effective voltages, namely, the two write-in voltages $\overline{U}_{s/on}$, and $\overline{U}_{s/off}$, the holding voltage $\overline{U}_h$ and the erasing voltage $\overline{U}_1$ being produced solely by a combination of suitable signal pulses or signal pulse groups of the elementary pulses from the pulses on the row and column conductors.

The process or method of the present invention is preferably used in displays which contain a liquid crystal layer having a bistability effect. However, it is also advantageous when the switchable medium exhibits a hysteresis in the contrast-voltage-diagram and the requisite limiting conditions, in particular the prescribed relationship between reaction time and pulse spacing, can be adhered to.

The invention is based on the fact that the medium or liquid crystal layer reacts to an average voltage value, which is an effective voltage, during the addressing time. This type of reaction can be assumed to occur when the times for the transition between the optical states are longer than the intervals between successive pulses.

The method is characterized in that the operation "erase", "write-in" and "hold" take place at the same time on the matrix and can be carried out exclusively using pulses of simple construction at a logic level. The standardized pulse height also have the advantage that the effective field strengths in the various areas of the medium differ to a lesser extent from one another and it is, therefore, possible to achieve a better exploitation of the state hysteresis. The process or method can be carried out without utilizing DC voltage components on the medium and, in particular in the case of liquid crystal displays, contributes toward a long life duration.

In a matrix display having a medium, which responds to effective voltages, and in fact also in a liquid crystal display, it has long been known to produce the various voltage values by phase shifts of varying degrees between row and column pulses, for example see German AS 22 37 996, German OS Nos. 24 14 609 or 25 04 764. These control processes, which form part of the prior art, are neither provided nor suitable for the operation of the bistable displays.

DESCRIPTION OF THE PREFERRED EMBODIMENTS

Figure 1:
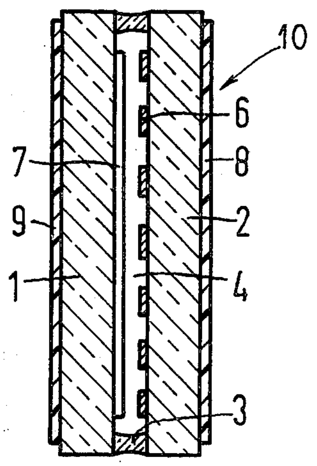
FIG. 1 is a cross-sectional view of a liquid crystal cell on which the method of the present invention may be utilized.

The principles of the present invention are particularly useful in operation of a liquid crystal display screen or device generally indicated at 10 in FIG. 1. The device 10 includes a pair of carrier plates 1 and 2, which are held by a frame 3 with their surfaces parallel to one another to form a chamber for receiving a liquid crystal layer 4. The carrier plate 1 on a surface facing the layer 4 is provided with a plurality of parallel strips 7 forming column conductors or electrodes. In a similar manner, the plate 2 on the surface facing the layer 4 has a plurality of parallel strips 6, which form row conductors or electrodes which, as illustrated, extend perpendicular to the column electrodes 7 to form a conductor matrix. The outer surface of the plates 1 is provided with a polarizer 9 and the outer surface of the plate 2 is provided with a polarizer 8 with the direction or orientation of polarization of the polarizer 8 extending perpendicular to that of the polarizer 9 so that the polarizers 8 and 9 form cross polarizers.

The liquid crystal layer 4 exhibits a bistability effect. Thus, when an upper threshold voltage $U_{12}$ is exceeded, the layer 4 will assume a homeotropic-nematic texture or optical state which, due to the cross polarizers of the cell 10, will produce an "off" state. When the voltage applied to the electrodes of the conductor matrix formed by the conductors 6 and 7 falls below a lower threshold voltage $U_{21}$, the optical state of the layer 4 will return or switch to a first state which is focal conical orientation which scatters or depolarized polarized light so that light will pass through the cross polarizers 8 and 9 and this state is known as an "on" state. Displays of this type are known from the above mentioned references and also are disclosed in German Offenlegungsschrift No. 23 61 421 and applicant's own German application P 25 42 235.

Liquid crystal display 10 is operated as follows. Individual rows formed by the conductors 6 are consecutively provided with addressing signals ("write-in" signals) for a specific length of time which is an addressing time t. During this time, the column conductors 7 receive information signals and, in fact, receive either an "off" signal or an "on" signal. At a relevant matrix point, the effective voltage U must be formed which can be either greater than $U_{12}$ or lower than $U_{21}$. Thus, $U_{s/off} > U_{12}$ and $U_{s/on} < U_{21}$. Following the addressing, the row will receive a "hold" signal. This value must be contrieved to be such that those matrix points to which one of the two information signals is connected on the column side, an effective hold voltage $\overline{U}_h$ between $U_{21}$ and $\overline{U}_{12}$ is applied.

Either one or several addressing times prior to the new write-in of the new cycle, the row is fed with an erasing signal, which, together with the "off" or "on" signal applied on the column conductor 7, will produce an effective erasing voltage $\overline{U}_1$ of sufficient magnitude at the matrix point or erase or switch the matrix point to the state with the homeotropic orientation.

The addressing time t is generally selected to be as short as possible. However, it must not be shorter than the reaction time of the liquid crystal layer for the transition from the homeotropic-nematic "off" state into the focal conical "on" state. This change in texture takes place more rapidly when $U_{s/on} = 0$.

The transition from the focal conical to the homeotropic-nematic orientation is generally carried out more slowly than the reverse texture change. Accordingly, the rows must be erased for several addressing periods prior to the next write-in period and during the addressing of one row, a group of several of the next rows must be erased.

Figure 2:
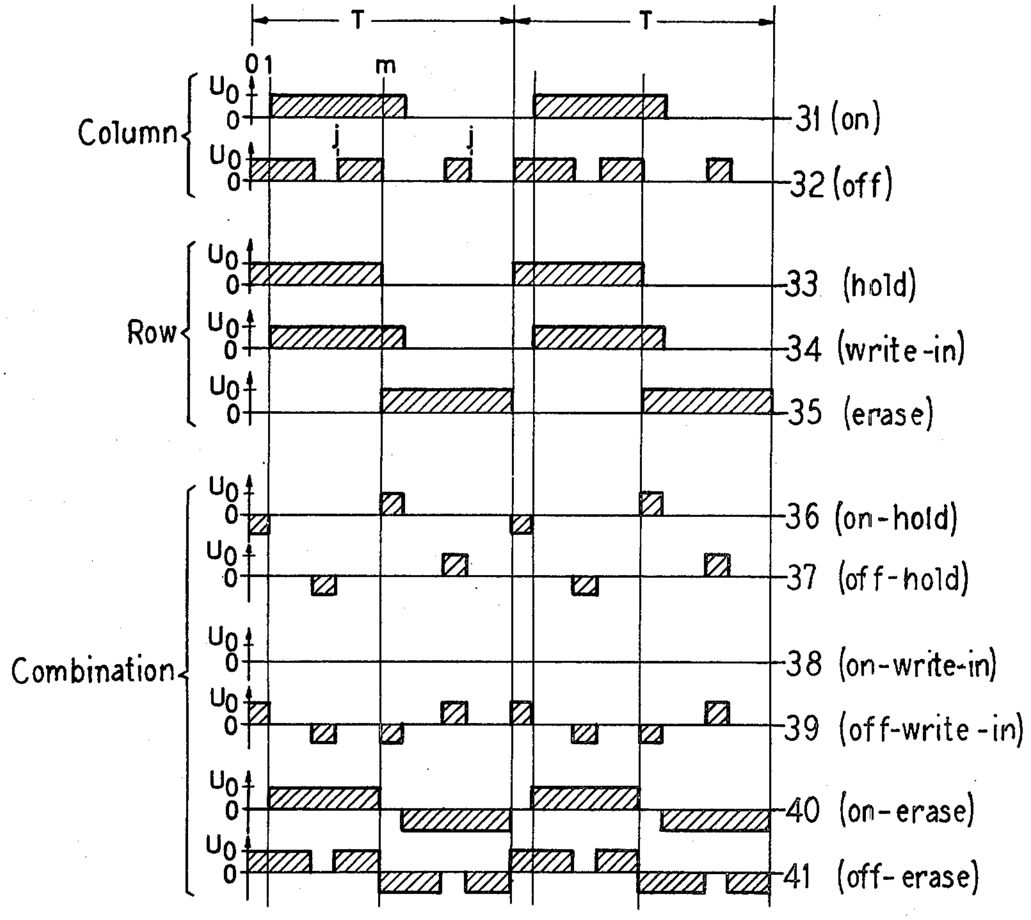
FIG. 2 is a graphical display of the various pulse sequences applied on the column and row conductors and the combinations therebetween at a matrix point.

FIG. 2 graphically illustrates different types of signals applied to the row and column conductors 6 and 7 and the combination signal which will be applied to the liquid crystal disposed at the matrix points. As illustrated in FIG. 2, row or line 31 illustrates an "on" signal E for a column conductor 7 and row or line 32 illustrates an "off" signal A for a column conductor 7. Row or line 33 illustrates a "hold" signal H for a row conductor 6, row or line 34 shows a "write-in" signal S for a row conductor and row or line 35 shows or illustrates an "erase" signal L for a row conductor.

Rows or lines 36–41 illustrate the various combinations of matrix signals that will be provided at a matrix point. For example, line 36 shows an "on"-"hold" combination and line 37 shows an "off"-"hold" combination. In a similar manner, line 38 shows a "write-in"-"on" signal combination; line 39 shows an "off"-"write-in" combination; row 40 shows an "on"-"erase" combination and row 41 shows an "off"-"erase" combination.

As can be seen from FIG. 2, all of the signals and thus also the different voltages at the individual matrix cells consist of a sequence of pulses or pulse groups, which have a common period of duration T whose length in the present case is that of the minimum addressing time $t_{min}$ and is governed by the reaction time of the liquid crystal layer. The pulses or groups of pulses not only possess the same repetition frequency but are composed of standard elementary pulses which have a magnitude or voltage $U_0$ and a width T/2m wherein m is a natural number. All the signals are formed so that the voltage $U_0$ is constantly checked in a specific pulse train having the duration T/2m and is either present or not present.

It can be seen from the diagrams in FIG. 2 that the pulses or groups of pulses each consist of m elementary pulses. All of the signals except the "off" signal in line 32, have the elementary pulses directly following one another without any gaps therebetween. The "off" signal of line 32 is composed of three spaced pulses with the first pulse of the sequence consisting of j-1 elementary pulses followed by a gap having a duration of one elementary pulse. A second pulse train of m - j successive elementary pulses, a second gap of j - 1 pulses and the third pulse of one elementary pulse. In the above j is a natural number with $1 \leq j \leq m$ and preferably $j \simeq m/2$. In the present case, the pulse groups for the holding signal (line 33) and the first pulses of the "off" signal pulse group (line 32) each start at the beginning of the addressing time T whereas the "write-in" signal pulses (line 34) and the "on" signal pulse (31) are delayed by one pulse width and the erasing signal pulse (line 35) is delayed by m pulse train widths.

With all the possible combinations between the rows and column signals, each individual matrix point will always receive a sequence of pulses or pulse groups in which the interval between the consecutive pulses is at a maximum half the period of duration T, i.e. the minimum addressing time $t_{min}$. Thus, it can be assumed that during the row addressing, effective voltages operate on the liquid crystal layer of the matrix point. In a first approximation for the effective value $\overline{U}$, we have $$\overline{U} = \sqrt{\frac{1}{T}\sum_{i=1}^{2m} U_i^2 \frac{T}{2m}}$$

Consequently, the column signals "off" and the "on" are maintained with the same effective holding voltage $$\overline{U}_h = \frac{1}{\sqrt{m}} U_0,$$

the signal "off" with $$\overline{U}_{s/off} = \sqrt{\frac{2}{m}}\, U_0 = \sqrt{2}\, \overline{U}_h$$

the signal "on" with $\overline{U}_{s/on}=0$ are written in, and the signals "off" and "on" with the same effective voltage will be erased by $$\overline{U}_1 = \sqrt{\frac{(m-1)}{m}}\, U_0$$

and with a high m. $\overline{U}_1 \simeq U_0$.

If $U_0$ has been predetermined, the liquid crystal display must be dimensioned in such a manner that $\overline{U}_1$ carries out a complete erasure within the shortest possible length of time. The holding voltage is then set by virtue of the selection of a suitable period division m; and $\overline{U}_h$ should lie as close as possible to $U_{12}$. When a fundamental frequency (1/T) and a division ratio m have been fixed, the fundamental period must be repeated.

Figure 3:
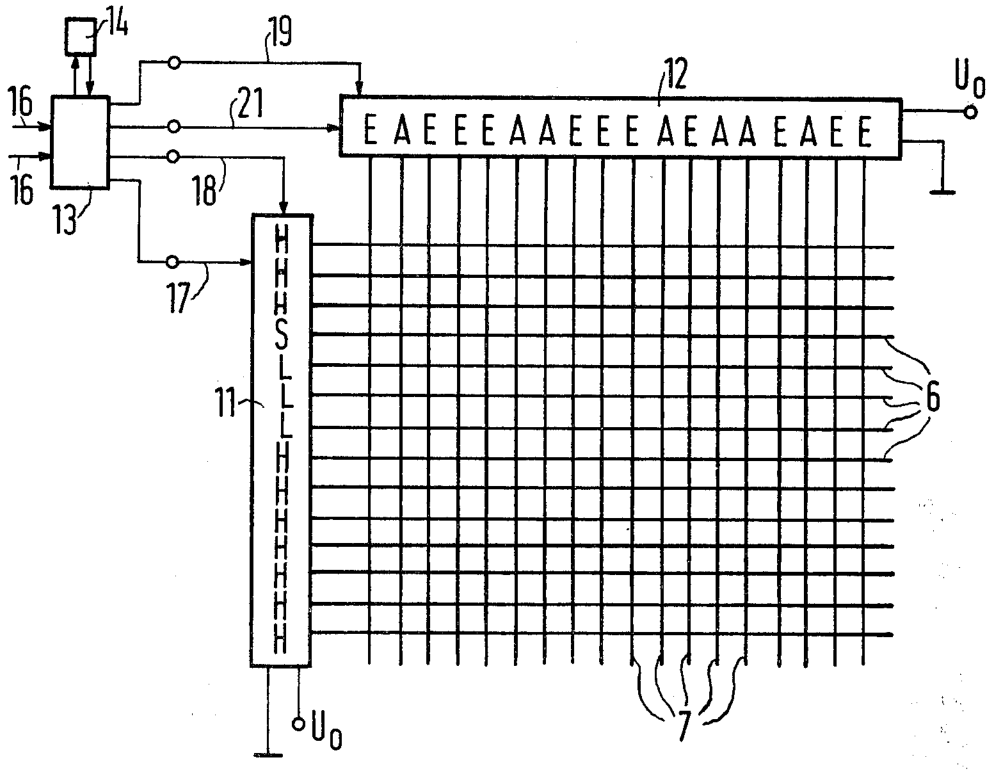
FIG. 3 is a block circuit diagram of a liquid crystal data viewing device being operated in accordance with the present invention.

In FIG. 3, the block diagram illustrates an operation of a liquid crystal display cell 10 in accordance with the present invention. The fundamental units of this component consist of a row shift register 11 having a series of inputs and parallel outputs, an identical column shift register 12, a micro-processer 13 and a store 14 which is connected to the micro-processer 13. The micro-processer 13 receives the data as indicated by arrow 16 and on the one hand provides a row shift register 11 with a row timing pulse line 17 and with a row information pulse line 18. On the other hand, processer 13 provides the column shift register 12 with a column timing pulse indicated by line 19 and a column information pulse indicated by line 21. As illustrated, the diagram shows the state in which the fourth row from the top is operated with a write-in signal S, rows 5-7 are operated with an erase signal L and all the other rows are operated or have applied thereto a holding signal H. During the addressing of the fourth row, information "on" signal E and "off" signal A for the fourth row have been accummulated in the column shift register 12 and are simultaneously fed to the columns.

The invention is not limited to the illustrated exemplary embodiments. Thus, the rows and columns of the conductor matrix are not always required to be of a strip shape. For example, in the case of a multi-digit alphanumeric display, the rear electrodes of every position can be the "rows" and the segment electrodes can be connected to form the columns. Furthermore, the requisite effective voltage corresponding to the invention can, of course, also be produced other than with the signals shown in FIG. 2. Here attention should be paid to ensuing that all the signals are offered at a logical level either "1" or "0" as the signals formed of this type can be produced with a particularly low electronic outlay and furthermore lead to a favorable write-in voltage for this state "on" wherein $U_{s/on}=0$.

Although various minor modifications may be suggested by those versed in the art, it should be understood that I wish to embody within the scope of the patent warranted hereon, all such modifications as reasonably and properly come within the scope of the art.

I claim:

1. In a method for operating a display screen having a liquid crystal layer disposed between rows and columns of a conductor matrix, said liquid crystal being switched from a first optical state to a second optical state by applying a voltage higher than an upper threshold voltage $U_{12}$, being switched from a second to the first optical state by applying a voltage lower than a lower threshold voltage $U_{21}$ and being maintained in one of said optical states by applying a holding voltage $U_h$ with $U_{21} < U_h < U_{12}$, said method comprising writing-in information into the display by addressing the rows in a serial fashion and operation of the column with the relevant row data in parallel with respect to each row with the information being subsequently held in the device and being erased prior to the next write-in step with the improvements comprising during the addressing of each row erasing a predetermined number of the next following rows while maintaining the states in the remaining rows, that all the signals which are fed to the conductor matrix, namely the switching, holding, erasing signals on the row conductors and the "on" and "off" information signals for the column conductors consist of a sequence of pulses or pulse groups with each of the sequences having the same period of duration T, all pulses of the sequences consisting of elementary pulses having a magnitude $U_0$ and a duration T/2m where m is a natural number and the interval of time between consecutive pulses being shorter than the shortest transition time of the layer between the two optical states, the row addressing time t being at least equal to the transition time of the layer from the second to the first optical state, so that effective voltages at the matrix point operate on the layer during the addressing time, said effective voltages, namely the two write-in voltages $\overline{U}_{s/on}$, $\overline{U}_{s/off}$, the holding voltage $\overline{U}_h$ and the erasing voltage $\overline{U}_1$ being produced solely by the combination of suitable signal pulses or signal pulse groups of the elementary pulses from the pulses on the row and column conductors.

2. In a method according to claim 1, wherein $\overline{U}_{s/on}=0$, $$\overline{U}_{s/off} = \sqrt{\frac{2}{m}}\, U_0,\ \overline{U}_{h/on} = \overline{U}_{h/off} = \overline{U}_h = \frac{1}{\sqrt{m}}\, U_0, \text{ and}$$

$$\overline{U}_1 = \sqrt{\frac{m-1}{m}}\, U_0.$$

3. A method according to claim 2, wherein the "on" signal, the holding signal, the write-in signal and the erase signal are formed of a sequence of pulses which consist of m directly consecutive elementary pulses, that the "off" signal consists of a pulse group of three pulses where the individual pulses of the pulse groups consist of a j - 1 pulse, an m - j pulse and one elementary pulse, respectively, wherein $1 \leq j \leq m$, with the spacing between the three pulses of 1 and j - 1 elementary pulse widths, respectively, wherein the holding signal pulse and the first pulse of the "off" signal pulse group commence at the beginning of the addressing time t, wherein the write-in signal and the "on" signal are delayed by one elementary pulse width and the erasing signal is delayed by m elementary pulse widths relative to the beginning of the addressing time t.

4. A method according to claim 3, wherein $j \simeq m/2$.

* * * * *